Dec. 4, 1951     M. W. MARIEN     2,577,140
PISTON PACKING RINGS AND ARRANGEMENT THEREOF
Filed Feb. 1, 1950
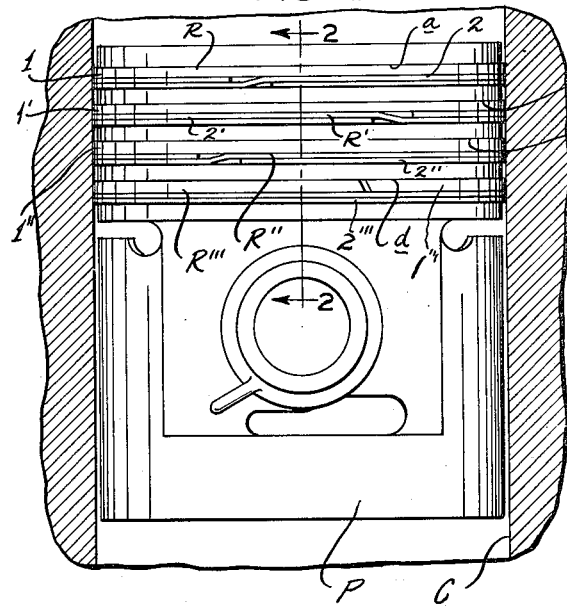
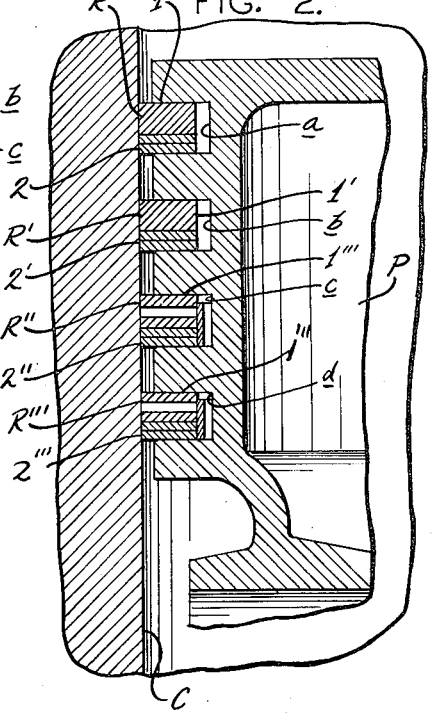
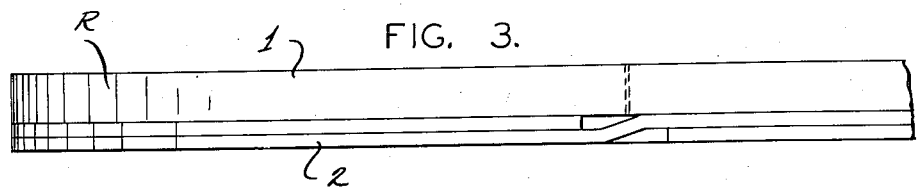
INVENTOR:
MELVIN W. MARIEN
BY *Harry L. Beines*
ATTORNEY.

Patented Dec. 4, 1951

2,577,140

UNITED STATES PATENT OFFICE 2,577,140

PISTON PACKING RINGS AND ARRANGEMENT THEREOF

Melvin W. Marien, St. Louis, Mo., assignor, by mesne assignments, to Ramsey Corporation, a corporation of Ohio Application February 1, 1950, Serial No. 141,643

5 Claims. (Cl. 309—43)

My invention has relation to improvements in piston packing rings and is directed to both the individual ring construction, and the relative pressure of the individual rings of the entire ring arrangement in a single piston.

In view of the great heat transmitted to the head of the piston by the combustion chamber, high unit pressure steel rings cannot be used satisfactorily in the upper grooves of the piston because of the scuffing of the steel surface. For this reason compression and blow-by cannot be eliminated or lessened close to the compression chamber where it is most desirable to make the correction. It is the practice, at the present time, to attempt this correction (with some results) by placing high unit pressure rings in the lower compression ring grooves. High unit pressure oil rings serve to control the oil flow over the cylinder wall and prevent leakage of the oil generally known as "oil pumping." However, "blow-by" or the loss of compression cannot be effectively prevented by this type of ring in the upper grooves.

A common type of high unit pressure ring now in use is the compound ring having both cast iron and steel elements, the latter exerting many times the unit pressure of the cast iron ring. These rings cannot be used in the top ring groove because of insufficient lubrication which would result in scuffing and scoring of the cylinder wall by the steel element.

I have discovered that a compound ring made up of both cast iron and steel elements may be safely used in the upper ring grooves with surprisingly good results, providing the pressure of the steel element is properly controlled so that the steel element will just fit snugly against the cylinder wall when in action with sufficient pressure only to maintain its seat on the wall during the rapid action of the piston.

It is thus the object of the invention to provide a compound piston ring made up of both cast iron and spring steel elements which will operate in the top piston groove to eliminate "blow-by" and compression loss, and at the same time will not injure the cylinder wall. My improved ring also improves the lubrication at the top of the cylinder, as will be better apparent from a detailed description of the invention in connection with the accompanying drawing, in which:

Figure 1 is a side elevation of a conventional piston equipped with my improved piston ring; Figure 2 is an enlarged vertical cross-section taken on the line 2—2 of Figure 1; and Figure 3 is an enlarged side elevation of a compression ring embodying the principles of my invention, parts being broken away.

Referring to the drawing, P represents a conventional piston having four ring grooves $a$, $b$, $c$ and $d$, the two upper grooves $a$ and $b$ having compression rings R, R' and the lower grooves $c$ and $d$ having oil rings R", R"' within them.

The rings R, R' are compound rings embodying a cast iron element 1 and a spring steel element 2 consisting of a two turn helix. This form of ring is well known in the art and has heretofore been employed especially for the purpose of oil control. However, as pointed out above, I propose to utilize a ring of this type as a compression ring by controlling the amount of pressure with which the helical ring element 2 bears against the cylinder wall. Thus, in the ring R the cast iron ring element 1 will bear with substantial pressure against the wall of the cylinder C while the steel helical element 2 will merely exert enough pressure against the cylinder C to contact therewith entirely around its periphery. Dropping down now to the ring R', which is also a compression ring, we still provide a cast iron ring 1' of considerable pressure while the helical ring 2' is designed to exert slightly more pressure against the cylinder wall C than the helical ring 2 immediately thereabove. This principle of increasing the pressure of the helical ring element is carried out throughout the entire series of rings so that when we consider the ring R" the pressure of the helical ring element 2" is again increased. Since this is an oil ring, the pressure of the ring 2" will now exceed the pressure of the cast iron ring 1". Of course, in connection with the bottommost spring R"', we are now approaching, so far as ring pressure is concerned, the standard oil control ring as now known and used in the art.

There are thus two principles involved in the present invention. The one is the provision of a combined cast iron and steel ring in the compression grooves of the piston, wherein the steel rings merely exert sufficient pressure against the cylinder wall to maintain contact therewith. The other principle involved in the invention is the progressive increase of pressure of the steel element forming a part of a series of compound rings from the top to the bottom of the piston or from the hottest to the coolest portions of the piston, and thus take fullest advantage of the decrease in temperature from the piston head downwardly.

As far as I know, this is a new principle in engine design and controls compression losses and oil pumping in a manner not heretofore possible.

The advantages of my invention may be summed up as follows:

1. The helical spring steel ring is gapless and serves to seal the gap in the cast iron ring to prevent blow-by.
2. Light unit pressure in top groove avoids ring scuffing and cylinder wall scoring.
3. The steel ring maintains contact with cylinder wall essentially through its circularity (due to helical winding) and not pressure.
4. Helical ring is not subject to collapse because wound in a plurality of resilient turns.

Having described by invention, I claim:

1. In combination with an internal combustion engine, a piston ring comprising a cast iron split annular element having an inherent radial tension to exert substantial pressure against the cylinder wall of the engine and thereby prevent blow-by, and a spring steel helical element juxtaposed to the cast iron element, said helical element having a negligible inherent radial tension merely to exert sufficient pressure against the engine cylinder wall to maintain circumferential contact therewith.

2. In combination with an internal combustion engine, a piston ring comprising a cast iron split annular element having an inherent radial tension to exert substantial pressure against the cylinder wall of the engine and thereby prevent blow-by, and a spring steel gapless helical element juxtaposed to the cast iron element, said helical element having a negligible inherent radial tension merely to exert sufficient pressure against the engine cylinder wall to maintain circumferential contact therewith.

3. In combination with an internal combustion engine, a piston ring comprising a cast iron split annular element having an inherent radial tension to exert substantial pressure against the cylinder wall of the engine and thereby prevent blow-by, and a spring steel helical element juxtaposed to the cast iron element, said helical element having a negligible inherent radial tension merely to exert sufficient pressure against the engine cylinder wall to maintain circumferential contact therewith but not enough pressure to serve as a scraper and remove lubricant from the cylinder wall.

4. In an internal combustion engine, having cylinders and pistons operating therein, each of said pistons having a plurality of ring grooves, a two-element piston ring in each groove, one of said elements comprising a split cast iron annulus, and the other element comprising a spring steel helical ring, the inherent tension of the helical ring elements in the respective ring grooves increasing from the piston head downwardly.

5. In combination with an internal combustion engine, a piston ring comprising a cast iron split annular element having an inherent radial tension to exert substantial pressure against the cylinder wall of the engine, and a spring element coiled in a plurality of turns from a flat ribbon of steel, said spring element having a negligible radial tension merely to exert sufficient pressure against the engine cylinder to maintain circumferential contact therewith.

MELVIN W. MARIEN.

REFERENCES CITED

The following references are of record in the file of this patent:

UNITED STATES PATENTS

| Number | Name | Date |
|---|---|---|
| 1,999,494 | Zahodiakin | Apr. 30, 1935 |
| 2,069,437 | Frank | Feb. 2, 1937 |
| 2,148,997 | Phillips | Feb. 28, 1939 |
| 2,303,798 | Solenberger | Dec. 1, 1942 |
| 2,328,390 | Nelson | Aug. 31, 1943 |